US012656827B2

(12) United States Patent
Ham et al.

(10) Patent No.: US 12,656,827 B2
(45) Date of Patent: Jun. 16, 2026

(54) DISPLAY DEVICE HAVING A SUPPORT MEMBER

(71) Applicant: Samsung Display Co., LTD., Yongin-si (KR)

(72) Inventors: Munsik Ham, Yongin-si (KR); Hosung Nam, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 239 days.

(21) Appl. No.: 18/520,553

(22) Filed: Nov. 28, 2023

(65) Prior Publication Data

US 2024/0284617 A1 Aug. 22, 2024

(30) Foreign Application Priority Data

Feb. 17, 2023 (KR) ........................ 10-2023-0021429

(51) Int. Cl.
*G06F 1/16* (2006.01)

(52) U.S. Cl.
CPC .................................. *G06F 1/1652* (2013.01)

(58) Field of Classification Search
CPC ..... G06F 1/1652; G09F 9/301; H04M 1/0268
See application file for complete search history.

(56) References Cited

U.S. PATENT DOCUMENTS

| | | | |
|---|---|---|---|
| 10,930,883 B2 * | 2/2021 | Park ..................... | H05K 5/0017 |
| 2022/0043485 A1 * | 2/2022 | Park ......................... | H05K 5/04 |
| 2023/0156934 A1 * | 5/2023 | Jiang ..................... | G06F 1/1681 |
| | | | 361/807 |

FOREIGN PATENT DOCUMENTS

| | | |
|---|---|---|
| KR | 10-2020-0102572 | 9/2020 |
| KR | 10-2022-0099165 | 7/2022 |

* cited by examiner

*Primary Examiner* — James Wu
(74) *Attorney, Agent, or Firm* — F. CHAU & ASSOCIATES, LLC

(57) ABSTRACT

A display device includes a display panel including a display area including a foldable area having flexibility and a non-folding area adjacent to at least one side of the foldable area and a support member disposed under the display panel, including a stretchable part overlapping the foldable area, and defining at least one cutting part. The at least one cutting part includes at least one first groove having a first depth and a second groove having a second depth greater than the first depth.

26 Claims, 13 Drawing Sheets

DISPLAY DEVICE HAVING A SUPPORT MEMBER

CROSS-REFERENCE TO RELATED APPLICATION

This application claims priority to and benefits of Korean Patent Application No. 10-2023-0021429 under 35 U.S.C. § 119, filed on Feb. 17, 2023 in the Korean Intellectual Property Office (KIPO), the entire contents of which are incorporated herein by reference.

BACKGROUND

1. Technical Field

Embodiments provide generally to a display device. More particularly, embodiments relate to a foldable display device.

2. Description of the Related Art

As information technology develops, the importance of display devices, which are communication media between users and information, is being highlighted. Accordingly, the use of display devices such as liquid crystal display devices, organic light emitting display devices, plasma display devices, and the like is increasing.

Recently, a flexible display device that can be deformed into various shapes has been developed. Unlike a flat panel display, a flexible display device may be folded, bent, or rolled like paper. The flexible display device is easy to carry and can improve user convenience. Recently, among flexible display devices, a foldable display device is in the limelight. The foldable display device may be repeatedly folded and unfolded.

SUMMARY

Embodiments provide a display device that does not include a separate structure covering an edge of a display panel.

A display device according to embodiments of the disclosure includes a display panel including a display area including a foldable area having flexibility and a non-folding area adjacent to at least one side of the foldable area and a support member disposed under the display panel, including a stretchable part overlapping the foldable area, and defining at least one cutting part. The at least one cutting part includes at least one first groove having a first depth and a second groove having a second depth greater than the first depth.

In an embodiment, the at least one cutting part may be adjacent to an edge of the support member.

In an embodiment, the at least one first groove may expose at least a part of the support member and the second groove may expose at least a part of the display panel.

In an embodiment, the at least one first groove may include a first side surface extending in a first direction and a second side surface extending in a second direction perpendicular to the first direction, and each of the first and second side surfaces may have straight line shape in a plan view.

In an embodiment, the at least one first groove may have a rectangular planar shape with one side open.

In an embodiment, the at least one first groove may have an "L" shape planar shape.

In an embodiment, the at least one first groove may include a plurality of first grooves, and each of the plurality of first grooves may have a rectangular planar shape with one side open.

In an embodiment, the plurality of first grooves may be spaced apart from each other.

In an embodiment, the at least one first groove may be connected to the second groove.

In an embodiment, the at least one first groove may be spaced apart from the second groove in a plan view.

In an embodiment, the second groove may overlap alignment marks disposed on a lower surface of the display panel in a plan view, and the at least one first groove may be spaced apart from the alignment marks in the plan view.

In an embodiment, sides surfaces defining the second groove may be connected to an edge of the support member.

In an embodiment, when viewed from the display panel toward the support member, the support member may be completely covered by the display panel in a plan view.

In an embodiment, an edge of the display panel may protrude outward from an edge of the support member.

In an embodiment, a plurality of openings are defined in the stretchable part and each of the plurality of openings may have a planar shape of any one of a rectangle, a rhombus, an ellipse, and a wavy shape.

In an embodiment, the support member may include at least one selected form a group consisting of stainless steel and a magnesium alloy.

In an embodiment, the support member may include at least one selected from a group consisting of carbon fiber reinforced plastic and glass fiber reinforced plastic.

A display device according to embodiments of the disclosure includes a display panel including a display area including a foldable area having flexibility and a non-folding area adjacent to at least one side of the foldable area, a first support member disposed under the display panel, including a stretchable part in which a plurality of openings defined and overlapping the foldable area, and defining at least one cutting part including at least one first groove having a first depth and a second groove having a second depth greater than the first depth, and a second support disposed under the first support member and including a first support plate and a second support plate spaced apart from each other.

In an embodiment, the at least one cutting part may be adjacent to an edge of the first support member.

In an embodiment, the at least one first groove may expose at least a part of the first support member, and the second groove may expose at least a part of the display panel.

In an embodiment, the at least one first groove may include a first side surface extending in a first direction and a second side surface extending in a second direction perpendicular to the first direction, and each of the first and second side surfaces may have straight line shape in a plan view.

In an embodiment, the at least one first groove may have a rectangular planar shape with one side open.

In an embodiment, the at least one first groove may have an "L" shape planar shape.

In an embodiment, the at least one first groove may include a plurality of first grooves, the plurality of first grooves may be spaced apart from each other, and each of the plurality of first grooves may have a rectangular planar shape with one side open.

In an embodiment, the second groove may overlap alignment marks disposed on a lower surface of the display panel in a plan view, and the at least one first groove may be spaced apart from the alignment marks in the plan view.

In an embodiment, when viewed from the display panel toward the first support member, the first support member may be completely covered by the display panel in a plan view.

In an embodiment, an edge of the display panel may protrude outward from an edge of the first support member.

In an embodiment, each of the first support member and the second support member may include at least one selected form a group consisting of stainless steel, a magnesium alloy, carbon fiber reinforced plastic, and glass fiber reinforced plastic.

A display device according to embodiments of the disclosure may include a display panel including a foldable area and a non-folding area adjacent to at least one side of the foldable area and a first support member disposed under the display panel. In this case, an edge of the display panel may protrude outward from an edge of the first support member. Accordingly, a display device that is not required to include a separate structure covering an edge of the display panel (e.g., a decoration or "deco") may be implemented. In addition, since the display device does not include the deco, aesthetics of the display device can be improved.

In addition, at least one cutting part including a first groove having a first depth and a second groove having a second depth greater than the first depth may be defined in the first support member. Accordingly, line defect of the display device can be improved. In addition, in the process of attaching the first support member to the display panel, the first support member can be accurately attached to the display panel.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
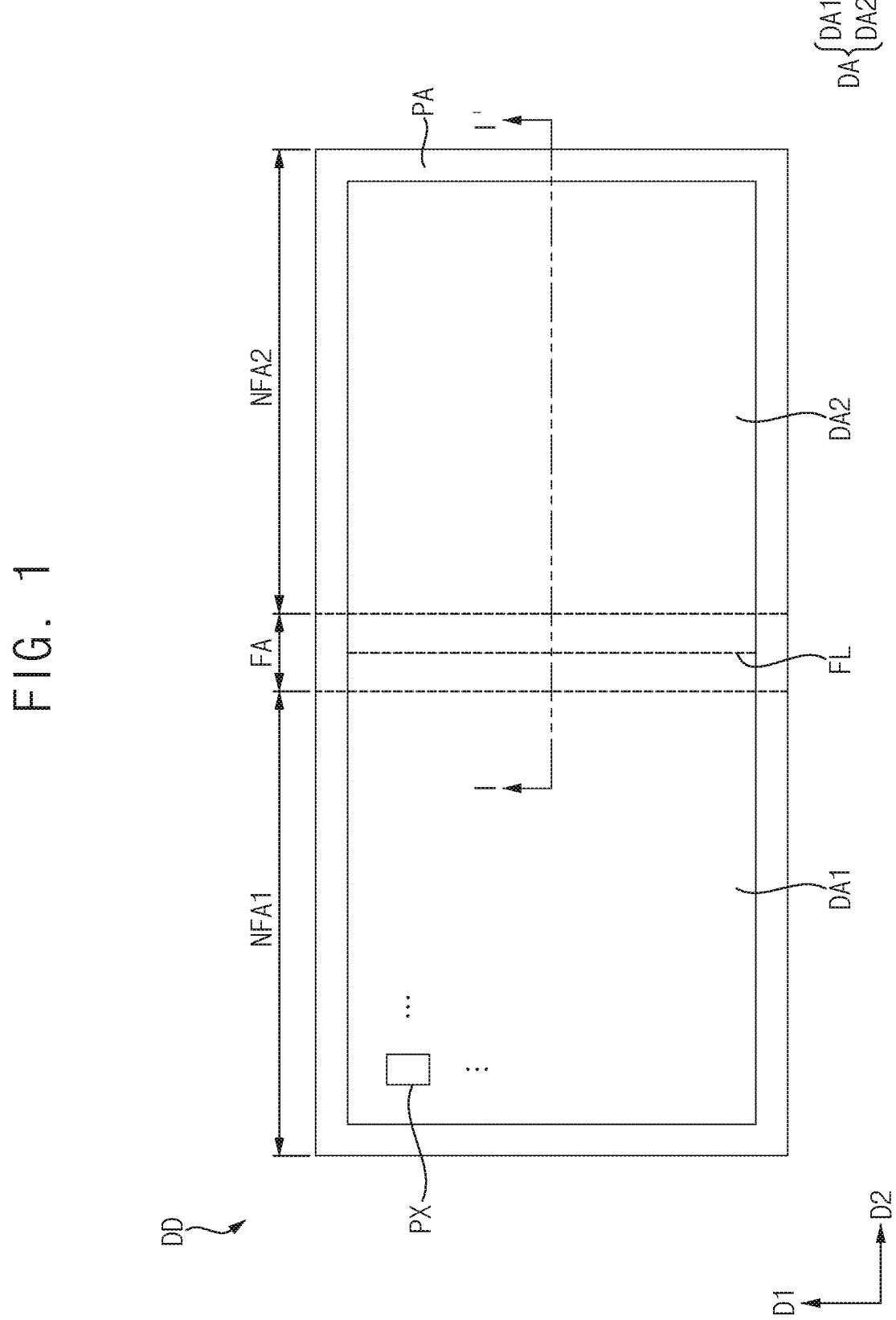
FIG. 1 is a schematic plan view illustrating a display device according to an embodiment of the disclosure.

Hereinafter, a display device according to embodiments of the disclosure will be explained in detail with reference to the accompanying drawings. The same reference numerals are used for the same components in the drawings, and redundant descriptions of the same components will be omitted.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Figure 2:
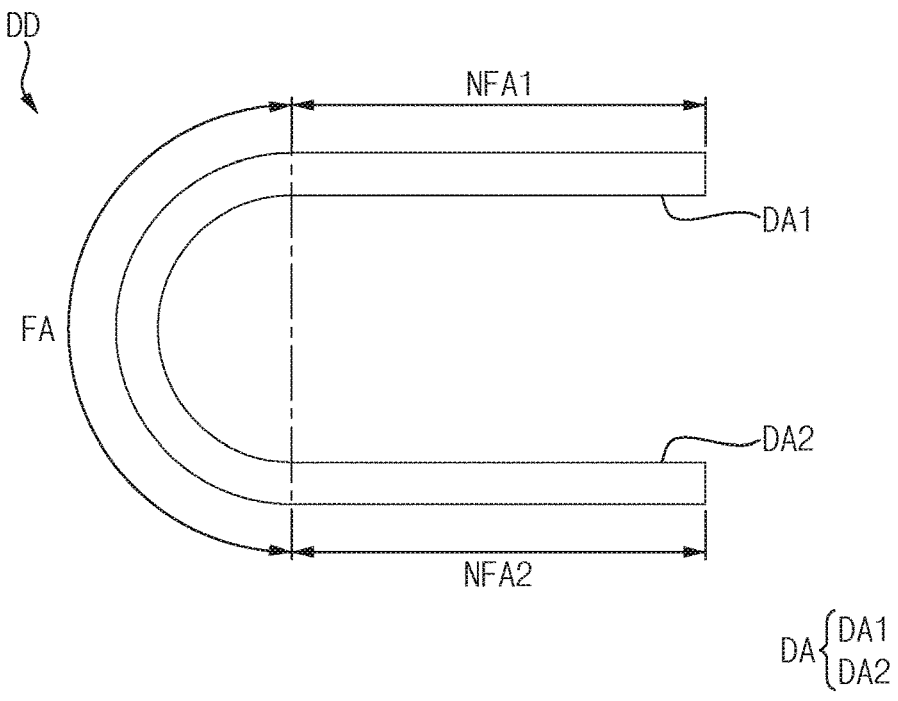
FIGS. 2 and 3 are schematic cross-sectional views illustrating a folded state of the display device of FIG. 1.
Figure 3:
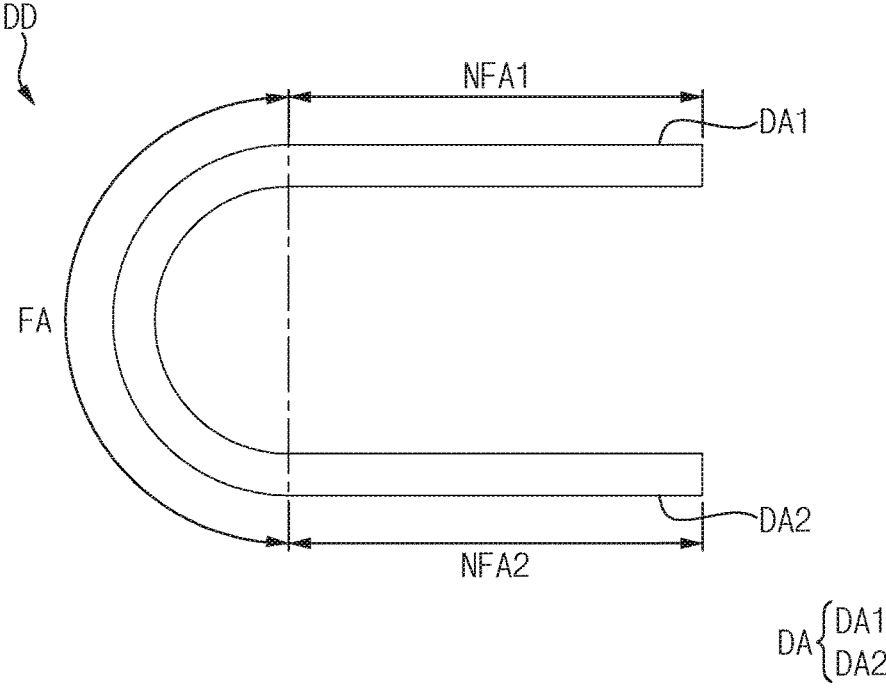

FIG. 1 is a schematic plan view illustrating a display device according to an embodiment of the disclosure. FIGS. 2 and 3 are schematic cross-sectional views illustrating a folded state of the display device of FIG. 1.

Referring to FIGS. 1, 2, and 3, a display device DD according to an embodiment may include a display area DA and a peripheral area PA. The peripheral area PA may be located around or adjacent to the display area DA. For example, the peripheral area PA may surround at least a part of the display area DA.

Pixels PX may be disposed in the display area DA. Each of the pixels PX may emit light. As each of the pixels PX emits light, the display area DA may display an image. For example, each of the pixels PX may include a transistor and a light emitting element electrically connected to the transistor.

The pixels PX may be arranged in a matrix form in a first direction D1 and a second direction D2 intersecting the first direction D1 in a plan view. For example, the first direction D1 may be perpendicular to the second direction D2.

A driving part may be disposed in the peripheral area PA. The driving part may transmit signals and/or voltages to the pixels PX. In an embodiment, the driving part may include a data driving part, gate driving part, or the like. The peripheral area PA may not display images.

At least a part of the display device DD may be flexible, and a flexible part (e.g., a foldable area FA) of the display device DD may be folded. For example, the display area DA may include the foldable area FA that can be bent by an external force to fold the display device DD, and first and second non-folding areas NFA1 and NFA2 that are adjacent to at least one side of the foldable area FA and are not bent. For example, the foldable area FA may have a folding line FL extending in the first direction D1. The expression "non-folding" may mean, e.g., being hard, firm, or solid without flexibility or mean, e.g., being flexible but not folded due to the flexibility of that area smaller than that of the foldable area FA.

The display area DA may be divided into a first display area DA1 and a second display area DA2. The first display area DA1 and the second display area DA2 may be adjacent to each other in the second direction D2. The first display area DA1 and the second display area DA2 may be continuously connected, be extended, and/or form a continuous area to form a display area DA.

For example, in case that the display area DA is folded along the folding line FL, as shown in FIG. 2, the display device DD may have an in-folding structure so that the first display area DA1 and the second display area DA2 face each other. As another example, in case that the display area DA is folded along the folding line FL, as shown in FIG. 3, the display device DD may have an out-folding structure so that the first display area DA1 and the second display area DA2 may be disposed outside.

Although FIG. 1 illustrates that the display device DD has a foldable area FA, the display device DD according to an embodiment of the disclosure is not limited to having one foldable area FA. For example, the display device DD may be folded multiple times or may have multiple foldable areas to implement a rollable display device.

Figure 4:
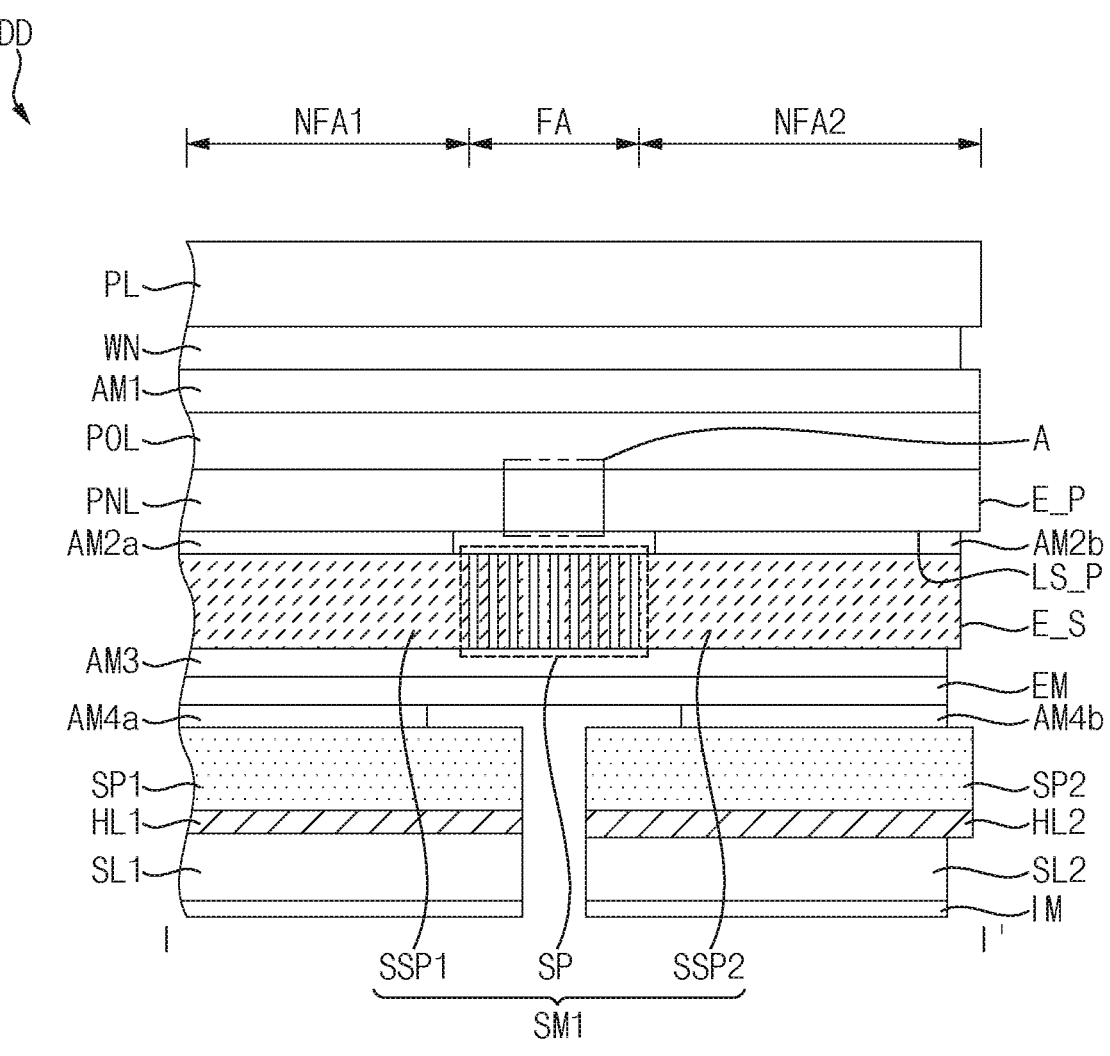
FIG. 4 is a schematic cross-sectional view taken along line I-I' of FIG. 1.

FIG. 4 is a schematic cross-sectional view taken along line I-I' of FIG. 1. For example, FIG. 4 may indicate a state in which the display device DD is unfolded.

Referring to FIG. 4, the display device DD according to an embodiment may include a window protection layer PL, a window member WN, a first adhesive member AM1, a polarization member POL, a display panel PNL, a second adhesive member AM2, a first support member SM1, a third adhesive member AM3, an elastic member EM, a fourth adhesive member AM4, a second support member SM2, a heat dissipation member HAM, a shock absorbing member SAM, and/or an insulating member IM.

The polarization member POL may be disposed on the display panel PNL. As the display device DD includes the foldable area FA, the display panel PNL may also have the foldable area FA. The display panel PNL may include pixels (e.g., the pixels PX of FIG. 1) that generate light. The polarization member POL may block external light incident on the display panel PNL from the outside.

The window member WN may be disposed on the polarization member POL. The window member WN may protect the display panel PNL. The window member WN may have a transmission part corresponding to the display area DA. The window member WN may include a polymer material, a glass thin film, or the like so as to be bendable.

For example, the window member WN may include ultra-thin glass (UTG). The ultra-thin glass may be tempered to have a stress profile therein. The ultra-thin glass can better prevent cracks caused by external impact, propagation of cracks, damage, and the like, than before being tempered. The ultra-thin glass may have various stresses for each area through a strengthening process.

For example, the ultra-thin glass of the window member WN may be chemically tempered thin glass to have high strength. However, embodiments of the disclosure are not limited thereto, and the ultra-thin glass of the window member WN may be a thermally tempered ultra-thin glass.

In case that the glass is composed of an ultra-thin film or a thin film, the glass may have a flexible characteristic and may have a characteristic of being able to be curved, bent, folded, or rolled. For example, the window member WN may include glass such as soda lime glass, alkali alumino silicate glass, borosilicate glass, lithium alumina silicate glass, and the like. These may be used alone or in combination with each other. However, embodiments of the disclosure are not limited thereto, and the window member WN may include various types of glass.

The first adhesive member AM1 may be disposed between the polarization member POL and the window member WN. The first adhesive member AM1 may attach the polarization member POL and the window member WN to each other. For example, the first adhesive member AM1 may include an optical clear adhesive (OCA), a pressure sensitive adhesive (PSA), a photocurable resin, a thermosetting resin, or the like. These may be used alone or in combination with each other.

The window protection layer PL may be disposed on the window member WN. The window protection layer PL may perform at least one function of scattering prevention, shock absorption, stamping prevention, fingerprint prevention, and glare prevention of the window member WN. The window protective layer PL may include a transparent polymer film. For example, the window protection layer PL may include epoxy resin, polyurethane, polyester, polyethylene terephthalate, polyethylene naphthalate, polyimide, polyarylate, polycarbonate, polymethyl methacrylate, ethyl vinyl acetate, polyamide resin, or the like. These may be used alone or in combination with each other.

The first support member SM1 may be disposed under the display panel PNL. The first support member SM1 may serve to support the display panel PNL. The first support member SM1 may serve to assist folding of the display panel PNL. The first support member SM1 may prevent foreign substances from being introduced into the display panel PNL from the outside. The first support member SM1 may emit or disperse heat generated from the display panel PNL.

The rigidity of the first support member SM1 may be greater than the rigidity of the display panel PNL. Accordingly, the first support member SM1 may prevent the display panel PNL from being deformed due to a user's external force or the like.

For example, the first support member SM1 may include a first support part SSP1, a second support part SSP2, and/or a stretchable part SP. The stretchable part SP may be located between the first support part SSP1 and the second support part SSP2. The stretchable part SP may overlap the foldable area FA, the first support part SSP1 may overlap the first non-folding area NFA1, and the second support part SSP2 may overlap the second non-folding area NFA2. Accordingly, the first and second support parts SSP1 and SSP2 may support parts of the display panel PNL overlapping the first and second non-folding areas NFA1 and NFA2, and the stretchable part SP may allow or help the folding of the display panel PNL.

The stretchable part SP may have stretch in response to folding and unfolding of the display device DD. However, although FIG. 4 illustrates a stretchable part SP, the embodiments of the disclosure are not limited thereto. For example, stretchable parts SP may be formed. A detailed description of the stretchable part SP will be described below.

In an embodiment, the first support member SM1 may include an alloy. For example, the first support member SM1 may include stainless steel (SUS), magnesium alloy, or the like. In another embodiment, the first support member SM1 may include glass or plastic. For example, the first support member SM1 may include carbon fiber-reinforced plastic (CFRP) or glass fiber-reinforced plastic (GFRP). However, embodiments of the disclosure are not limited thereto, and the first support member SM1 may include various materials.

When viewed from the display panel PNL toward the first support member SM1, the first support member SM1 may overlap the display panel PNL. For example, the first support member SM1 may be completely covered by the display panel PNL. In an embodiment, an edge E_P of the display panel PNL may protrude outward from an edge E_S of the first support member SM1. Accordingly, the display device DD that is not required to include a separate structure covering the edge E_P of the display panel PNL (e.g., a decoration or "deco"). As the display device DD does not include the deco, for example, the manufacturing process or cost of the display device may be improved, and aesthetics of the display device DD can be improved.

The second adhesive member AM2 may be disposed between the first support member SM1 and the display panel PNL. The second adhesive member AM2 may include a first adhesive layer AM2*a* and a second adhesive layer AM2*b* spaced apart from each other in the second direction D2. Each of the first adhesive layer AM2*a* and the second adhesive layer AM2*b* may not overlap the foldable area FA. The second adhesive member AM2 may attach the display panel PNL and the first support member SM1 to each other. For example, the second adhesive member AM2 may include an optically transparent adhesive, a pressure sensitive adhesive, a photocurable resin, a thermosetting resin, or the like. These may be used alone or in combination with each other.

The elastic member EM may be disposed under the first support member SM1. The elastic member EM may be disposed between the first support member SM1 and the second support member SM2. At least part of the elastic member EM may overlap the foldable area FA. While the display device DD repeatedly performs folding and unfolding, the elastic member EM may prevent foreign substances from penetrating the stretchable part SP. While the display device DD repeatedly performs folding and unfolding, the elastic member EM may be stretched and contracted so as not to expose the stretchable part SP.

For example, the elastic member EM may include an elastic polymer having a relatively high elasticity or a relatively high restoring force. For example, the elastic member EM may include an elastic material such as silicone, urethane, thermoplastic polyurethane (TPU), and the like. These may be used alone or in combination with each other.

The third adhesive member AM3 may be disposed between the first support member SM1 and the elastic member EM. The third adhesive member AM3 may attach the first support member SM1 and the elastic member EM to each other. For example, the third adhesive member AM3 may include an optically transparent adhesive, a pressure sensitive adhesive, a photocurable resin, a thermosetting resin, or the like. These may be used alone or in combination with each other.

The second support member SM2 may be disposed under the first support member SM1. The second support member SM2 may include a first support plate SP1 and a second support plate SP2 spaced apart from each other. The first support plate SP1 and the second support plate SP2 may be spaced apart from each other in the second direction D2. Each of the first support plate SP1 and the second support plate SP2 may at least partially overlap the foldable area FA.

For example, in case that the display device DD is folded, a distance between the first support plate SP1 and the second support plate SP2 may increase. The second support member SM2 may prevent the stretchable part SP of the first support member SM1 from being pressed.

In an embodiment, the second support member SM2 may include an alloy. For example, the second support member SM2 may include stainless steel (SUS) or magnesium alloy. In another embodiment, the second support member SM2 may include glass or plastic. For example, the second support member SM2 may include carbon fiber-reinforced plastic (CFRP) or glass fiber-reinforced plastic (GFRP). However, embodiments of the disclosure are not limited thereto, and the second support member SM2 may include various materials.

The fourth adhesive member AM4 may be disposed between the elastic member EM and the second support member SM2. The fourth adhesive member AM4 may include a first adhesive layer AM4a and a second adhesive layer AM4b spaced apart from each other in the second direction D2. The first adhesive layer AM4a and the second adhesive layer AM4b may not overlap the foldable area FA. The first adhesive layer AM4a may attach the elastic member EM and the first support plate SP1 to each other, and the second adhesive layer AM4b may attach the elastic member EM and the second support plate SP2 to each other. For example, the fourth adhesive member AM4 may include an optically transparent adhesive, a pressure-sensitive adhesive, a photocurable resin, or a thermosetting resin. These may be used alone or in combination with each other.

The heat dissipation member HAM may be disposed under the second support member SM2. The heat dissipation member HAM may include a first heat dissipation layer HL1 and a second heat dissipation layer HL2 spaced apart from each other. The first heat dissipation layer HL1 and the second heat dissipation layer HL2 may be spaced apart from each other in the second direction D2. Each of the first heat dissipation layer HL1 and the second heat dissipation layer HL2 may at least partially overlap the foldable area FA.

The heat dissipation member HAM may include a material having high thermal conductivity. For example, the heat dissipation member HAM may include aluminum (Al), copper (Cu), and the like. These may be used alone or in combination with each other. In other embodiments, the heat dissipation member HAM may be omitted.

The shock absorbing member SAM may be disposed under the heat dissipation member HAM. The shock absorbing member SAM may include a first cushion layer SL1 and a second cushion layer SL2 spaced apart from each other. The first cushion layer SL1 and the second cushion layer SL2 may be spaced apart from each other in the second direction D2. Each of the first cushion layer SL1 and the second cushion layer SL2 may partially overlap the foldable area FA.

The shock absorbing member SAM may protect the display panel PNL from external impact. The shock absorbing member SAM may include a material having ductility so that the display device DD can be easily folded. For example, the shock absorbing member SAM may include a foam material such as polyurethane foam, polystyrene foam, and the like. These may be used alone or in combination with each other.

The insulating member IM may be disposed under the shock absorbing member SAM. For example, the insulating member IM may be formed in the form of a film or tape. The insulating member IM may prevent rattling from occurring in the display device DD.

As described above, since the display device DD according to an embodiment may be folded or unfolded, each of the window protection layer PL, the window member WN, the polarization member POL, the display panel PNL, and the first support member SM1 may have flexibility.

Figure 5:
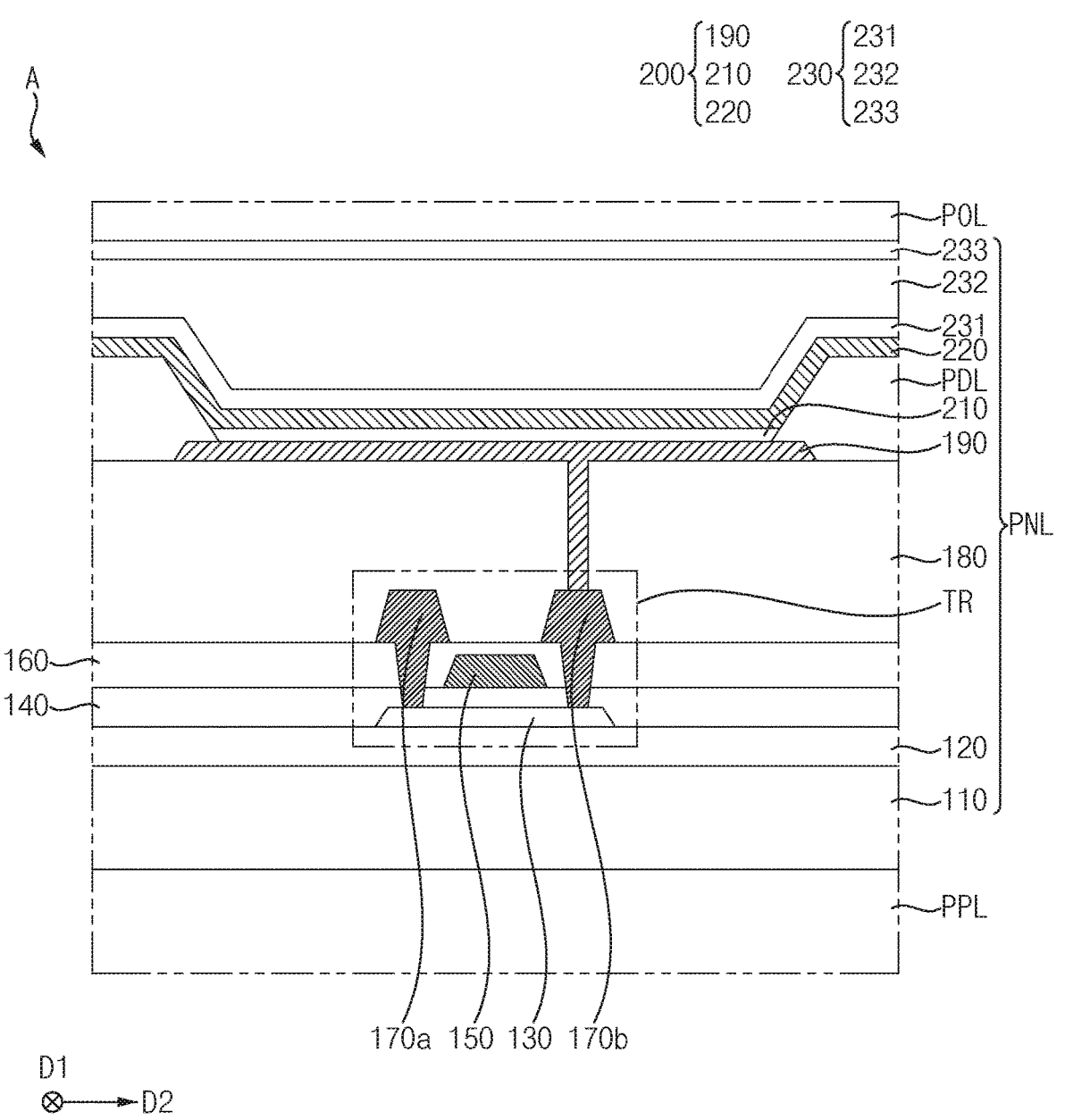
FIG. 5 is a schematic enlarged cross-sectional view of area A of FIG. 4.
Figure 6:
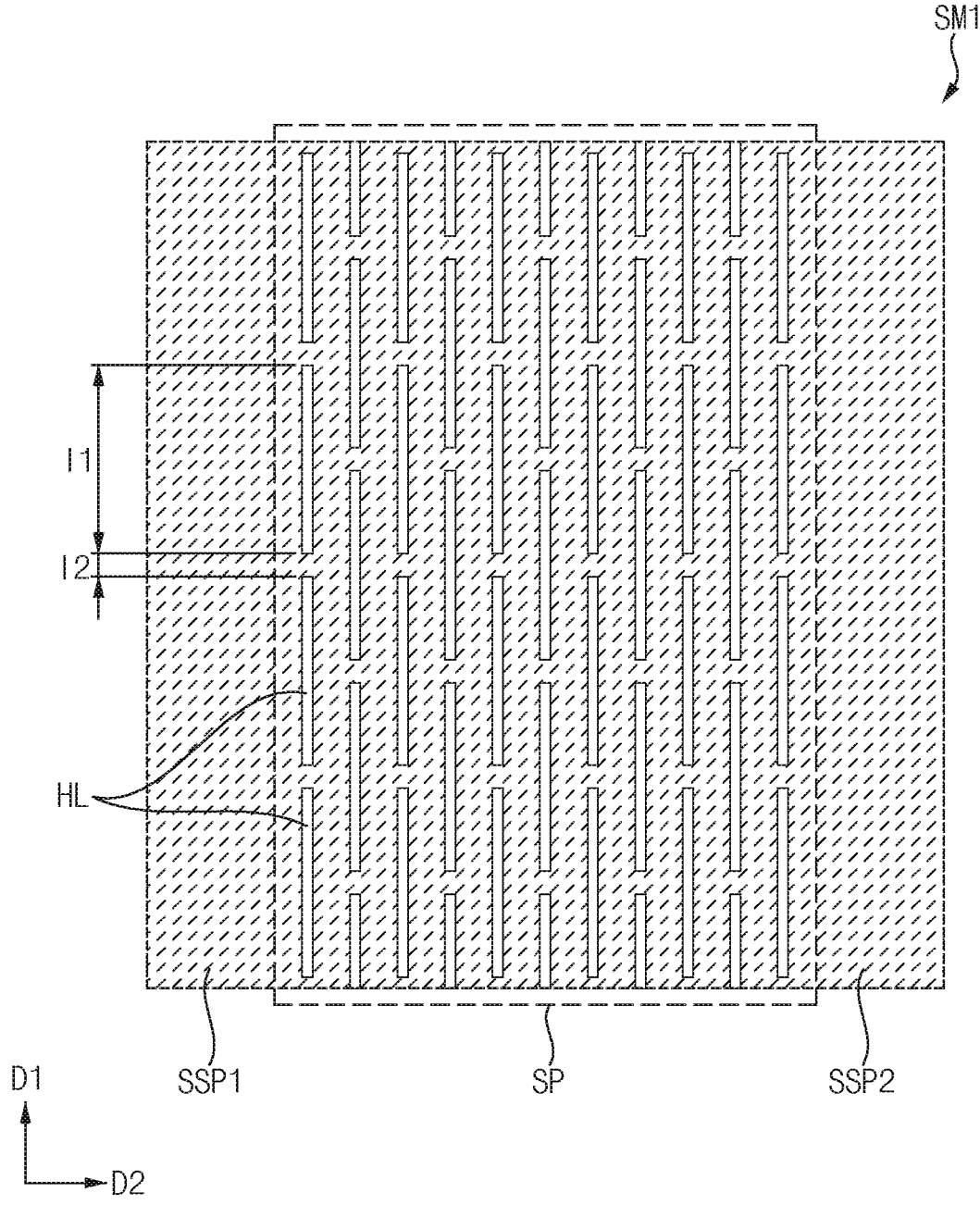
FIGS. 6, 7, 8, and 9 are schematic plan views illustrating a support member of FIG. 4.
Figure 7:
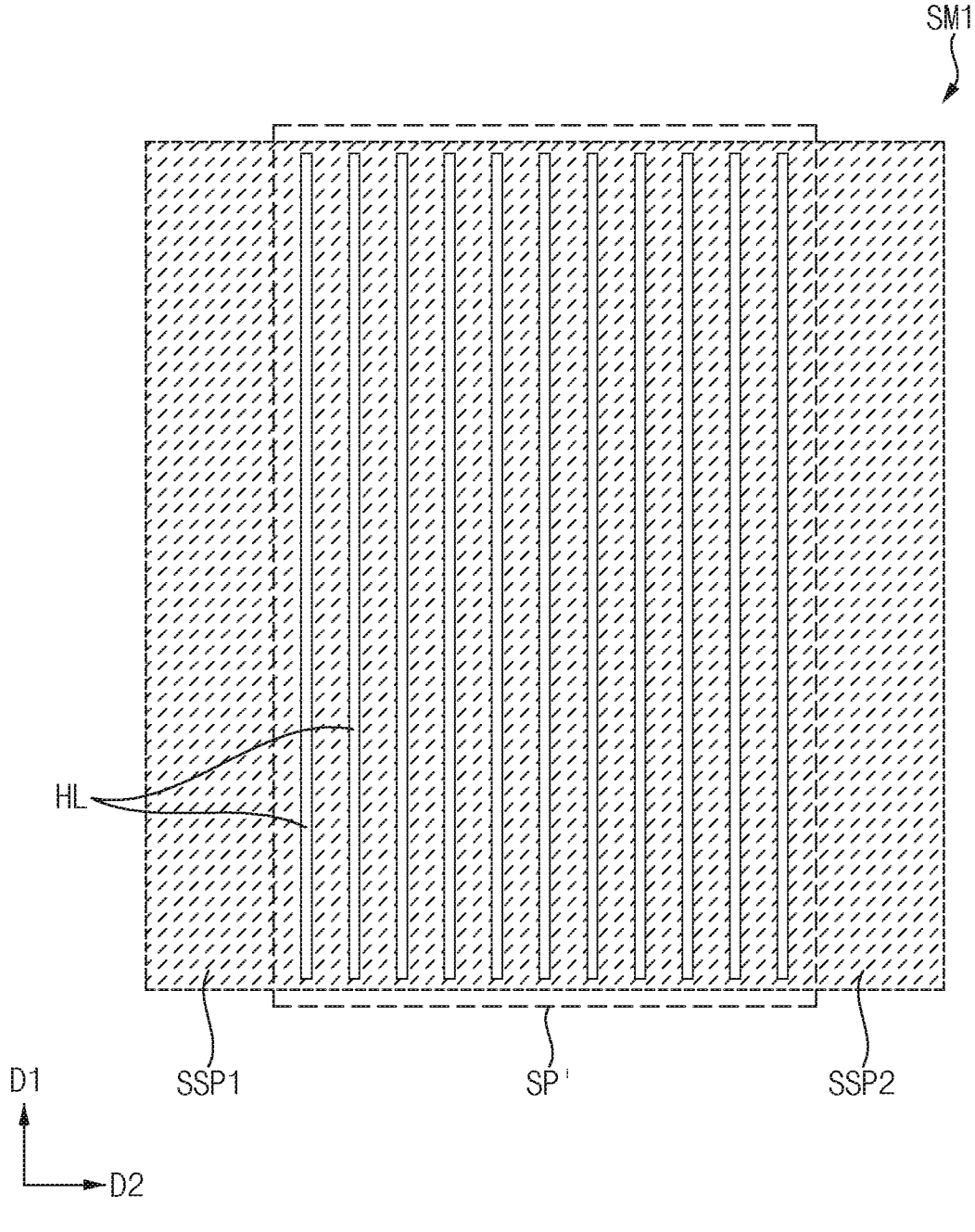
Figure 8:
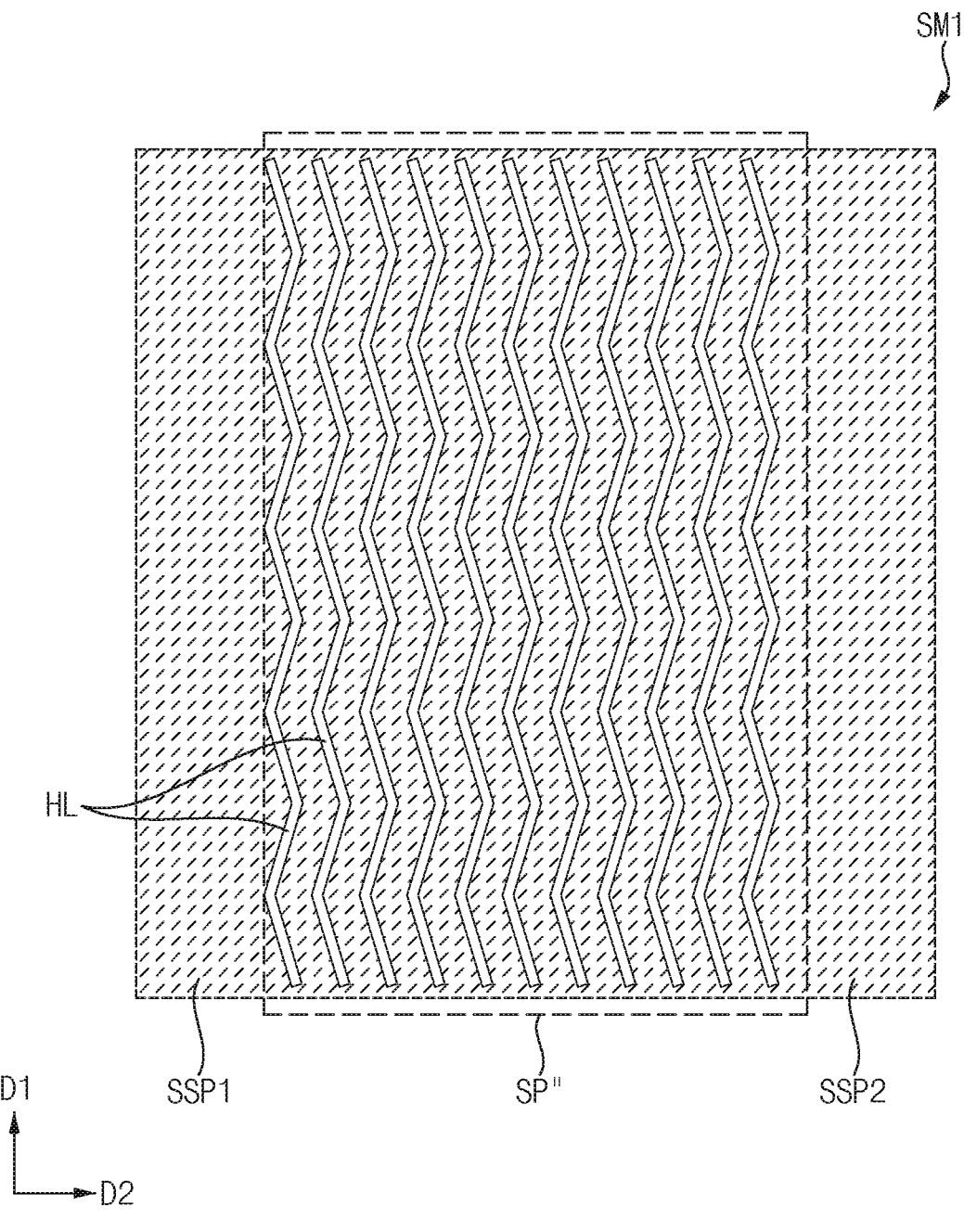
Figure 9:
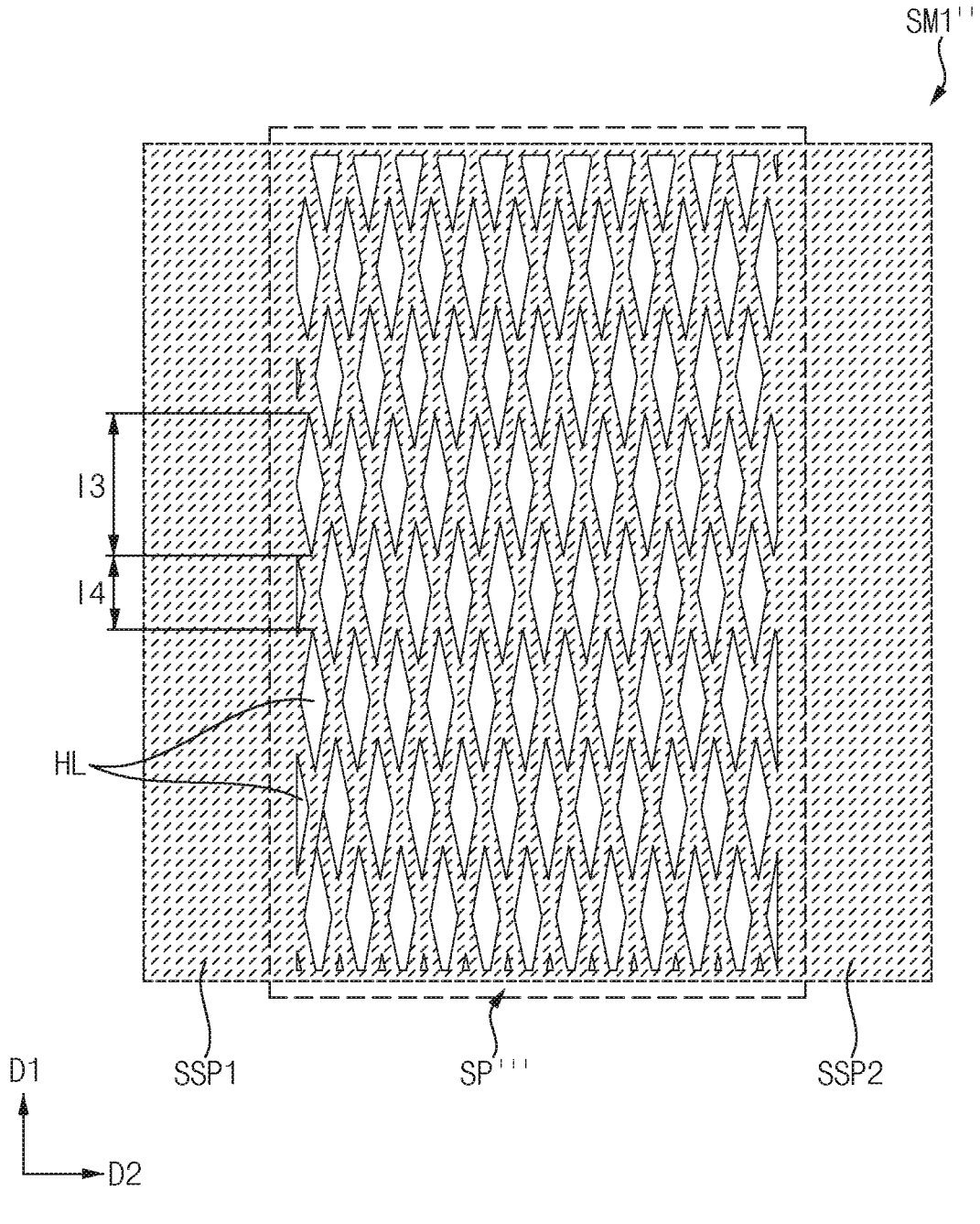

FIG. 5 is a schematic enlarged cross-sectional view of area A of FIG. 4. For example, FIG. 5 is a schematic enlarged cross-sectional view of a part of the display panel PNL of FIG. 4.

Referring to FIG. 5, the display panel PNL of the display device DD according to an embodiment of the disclosure may include a substrate 110, a buffer layer 120, a gate insulating layer 140, a transistor TR, an interlayer insulating layer 160, a planarization layer 180, a pixel defining layer PDL, a light emitting element 200, and an encapsulation layer 230.

The transistor TR may include an active layer 130, a gate electrode 150, a source electrode 170a, and a drain electrode 170b. The light emitting element 200 may include a lower electrode 190, a light emitting layer 210, and an upper electrode 220. The encapsulation layer 230 may include a first thin film encapsulation layer 231, a second thin film encapsulation layer 232, and a third thin film encapsulation layer 233.

A panel protection layer PPL may be disposed under the substrate 110. The panel protection layer PPL may protect a lower part of the display panel PNL. The panel protection layer PPL may include a flexible plastic material. For example, the panel protection layer PPL may include polyethylene terephthalate and the like. However, materials included in the panel protection layer PPL are not limited thereto, and the panel protection layer PPL may include other flexible plastic materials.

The substrate 110 may include a transparent material or an opaque material. The substrate 110 may include a flexible transparent resin substrate. An example of a transparent resin substrate that can be used as the substrate 110 may include a polyimide substrate. As another example, the substrate 110 may include a quartz substrate, a synthetic quartz substrate, a calcium fluoride substrate, a soda-lime glass substrate, an alkali-free glass substrate, or the like. These may be used alone or in combination with each other.

The buffer layer 120 may be disposed on the substrate 110. The buffer layer 120 may prevent diffusion of metal atoms or impurities from the substrate 110 into the transistor TR. For example, the buffer layer 120 may include an inorganic material such as silicon oxide, silicon nitride, and the like. These may be used alone or in combination with each other.

The active layer 130 may be disposed on the buffer layer 120. The active layer 130 may include a metal oxide semiconductor, an inorganic semiconductor (e.g., amorphous silicon, poly silicon, or an organic semiconductor). The active layer 130 may include a source region, a drain region, and a channel region located between the source region and the drain region.

The gate insulating layer 140 may be disposed on the buffer layer 120. The gate insulating layer 140 may sufficiently cover the active layer 130 on the substrate 110 and may have a substantially flat upper surface without creating a step around the active layer 130. As another example, the gate insulating layer 140 may cover the active layer 130 on the substrate 110 and may be disposed along the profile of the active layer 130 with a uniform thickness. For example, the gate insulating layer 140 may include silicon oxide ($SiO_x$), silicon nitride ($SiN_x$), silicon carbide ($SiC_x$), silicon oxynitride ($SiO_xN_y$), silicon oxycarbide ($SiO_xC_y$), and the like. These may be used alone or in combination with each other.

The gate electrode 150 may be disposed on the gate insulating layer 140. The gate electrode 150 may overlap the channel region of the active layer 130. For example, the gate electrode 150 may include a metal, an alloy, a metal nitride, a conductive metal oxide, and a transparent conductive material. These may be used alone or in combination with each other.

The interlayer insulating layer 160 may be disposed on the gate insulating layer 140. The interlayer insulating layer 160 may sufficiently cover the gate electrode 150 on the substrate 110 and may have a substantially flat upper surface without creating a step around the gate electrode 150. As another example, the interlayer insulating layer 160 may cover the gate electrode 150 on the substrate 110 and may be disposed along the profile of the gate electrode 150 with a uniform thickness. For example, the interlayer insulating layer 160 may include silicon oxide, silicon nitride, silicon carbide, silicon oxynitride, silicon oxycarbide, or the like. These may be used alone or in combination with each other.

The source electrode 170a and the drain electrode 170b may be disposed on the interlayer insulating layer 160. The source electrode 170a may be electrically connected to the source region of the active layer 130 through a contact hole penetrating a first part of the gate insulating layer 140 and the interlayer insulating layer 160, and the drain electrode 170b may be electrically connected to the drain region of the active layer 130 through a contact hole penetrating a second part of the gate insulating layer 140 and the interlayer insulating layer 160. For example, each of the source electrode 170a and the drain electrode 170b may include a metal, an alloy, a metal nitride, a conductive metal oxide, a transparent conductive material, or the like. These may be used alone or in combination with each other.

Accordingly, the transistor TR including the active layer 130, the gate electrode 150, the source electrode 170a, and the drain electrode 170b may be disposed in the display area DA on the substrate 110.

The planarization layer 180 may be disposed on the interlayer insulating layer 160. The planarization layer 180 may sufficiently cover the source electrode 170a and the drain electrode 170b. The planarization layer 180 may include an organic material and/or an inorganic material. In an embodiment, the planarization layer 180 may include an organic material. For example, the planarization layer 180 may include an organic material such as polyimide-based resin, photoresist, polyacryl-based resin, polyamide-based resin, siloxane-based resin, or the like. These may be used alone or in combination with each other.

The lower electrode 190 may be disposed on the planarization layer 180. The lower electrode 190 may be electrically connected to the drain electrode 170b through a contact hole penetrating the planarization layer 180. For example, the lower electrode 190 may include a metal, an alloy, a metal nitride, a conductive metal oxide, a transparent conductive material, or the like. These may be used alone or in combination with each other.

The pixel defining layer PDL may be disposed on the planarization layer 180. An opening exposing at least a part of an upper surface of the lower electrode 190 may be defined in the pixel defining layer PDL. The pixel defining layer PDL may include an organic material and/or an inorganic material. For example, the pixel defining layer PDL may include an organic material such as polyimide-based resin, photoresist, polyacrylic resin, polyamide-based resin, siloxane-based resin, or the like. These may be used alone or in combination with each other.

The light emitting layer 210 may be disposed on the lower electrode 190. The light emitting layer 210 may be disposed on the lower electrode 190 exposed by the opening. The light emitting layer 210 may be formed using at least one of light emitting materials capable of emitting red light, green light, and blue light. As another example, the light emitting layer 210 may emit white light as a whole by stacking light emitting materials capable of generating different colors of light such as red light, green light, and blue light.

The upper electrode 220 may be disposed on the pixel defining layer PDL and the light emitting layer 210. For example, the upper electrode 220 may include a metal, an alloy, a metal nitride, a conductive metal oxide, a transparent conductive material, or the like. These may be used alone or in combination with each other.

Accordingly, the light emitting element 200 including the lower electrode 190, the light emitting layer 210, and the upper electrode 220 may be disposed on the substrate 110 in the display area DA.

The first thin film encapsulation layer 231 may be disposed on the upper electrode 220. The first thin film encapsulation layer 231 may prevent the light emitting layer 210 from deteriorating due to penetration of moisture, oxygen, and the like. The first thin film encapsulation layer 231 may also perform a function of protecting the display panel PNL from external impact. For example, the first thin film encapsulation layer 231 may include inorganic materials having flexibility.

The second thin film encapsulation layer 232 may be disposed on the first thin film encapsulation layer 231. The second thin film encapsulation layer 232 can improve flatness of the display panel PNL and protect the display panel PNL. For example, the second thin film encapsulation layer 232 may include flexible organic materials.

The third thin film encapsulation layer 233 may be disposed on the second thin film encapsulation layer 232. The third thin film encapsulation layer 233 together with the first thin film encapsulation layer 231 may prevent the light emitting layer 210 from deteriorating due to penetration of moisture, oxygen, or the like. The third thin film encapsulation layer 233 may protect the display panel PNL together with the first thin film encapsulation layer 231 and the second thin film encapsulation layer 232 from external impact. For example, the third thin film encapsulation layer 233 may include inorganic materials having flexibility.

However, although the display device DD of the disclosure is limited to an organic light emitting display device with reference to FIGS. 1, 2, 3, 4, and 5 again, the embodiments of the disclosure are not limited thereto. For example, the display device DD may include a liquid crystal display device (LCD), a field emission display device (FED), a plasma display device (PDP), an electrophoretic display device (EPD), or quantum dot display device.

FIGS. 6, 7, 8, and 9 are schematic plan views illustrating a first support member of FIG. 4.

Referring to FIGS. 6, 7, 8, and 9, as described above, the first support member SM1 may include the first support part SSP1, the second support part SSP2, and the stretchable part SP. In an embodiment, openings HL may be defined in the stretchable part SP. For example, each of the openings HL may have a planar shape of any one of a rectangle, a rhombus, an ellipse, a wavy shape, and a rectangle with rounded corners. For example, the openings HL may be formed by removing a part of the stretchable part SP through an etching process or a punching process.

Referring back to FIG. 6, each of the openings HL may extend in the first direction D1. For example, the long axis of each of the openings HL may be parallel to the first direction D1.

The openings HL may have a same planar shape. For example, each of the openings HL may have a rectangular planar shape. Each of the openings HL may have a length l1 (e.g., a predetermined or selectable length). The openings HL arranged in a same column may be spaced apart by a distance l2 (e.g., a predetermined or selectable distance l2. The openings HL arranged in the same column may be arranged parallel to or offset from the openings HL arranged in another adjacent column.

Referring back to FIG. 7, in another embodiment, a first support member SM1' may include a stretchable part SP', in which each of the openings HL may extend in the first direction D1. For example, the long axis of each of the openings HL may be parallel to the first direction D1. The openings HL may be arranged to be spaced apart from each other in the second direction D2.

The openings HL may have a same planar shape. For example, each of the openings HL may have a rectangular planar shape and extend in the first direction D1. Only an opening HL may be arranged in a column among the openings HL.

Referring back to FIG. 8, in another embodiment, a first support member SM1" may include a stretchable part SP", in which each of the openings HL may extend in the first direction D1. The openings HL may be arranged to be spaced apart from each other along the second direction D2.

The openings HL may have the same planar shape. For example, each of the openings HL may have a wavy planar shape. In an embodiment, only one opening HL may be arranged in one column among the openings HL.

Referring back to FIG. 9, in another embodiment, a first support member SM1''' may include a stretchable part SP''', in which the openings HL may have a same planar shape. For example, each of the openings HL may have a rhombic planar shape. In this case, each of the openings HL may have a length l3 (e.g., a predetermined or selectable length). The openings HL arranged in the same column may be spaced apart by an interval l4 (e.g., a predetermined or selectable interval). The openings HL arranged in the same column may be arranged parallel to or misaligned with the openings HL arranged in another adjacent column.

However, embodiments of the disclosure are not limited thereto, and the shape and size of each of the openings HL may vary. For example, each of the openings HL may have a planar shape of any one of a rectangle with rounded corners and an ellipse.

Figure 10:
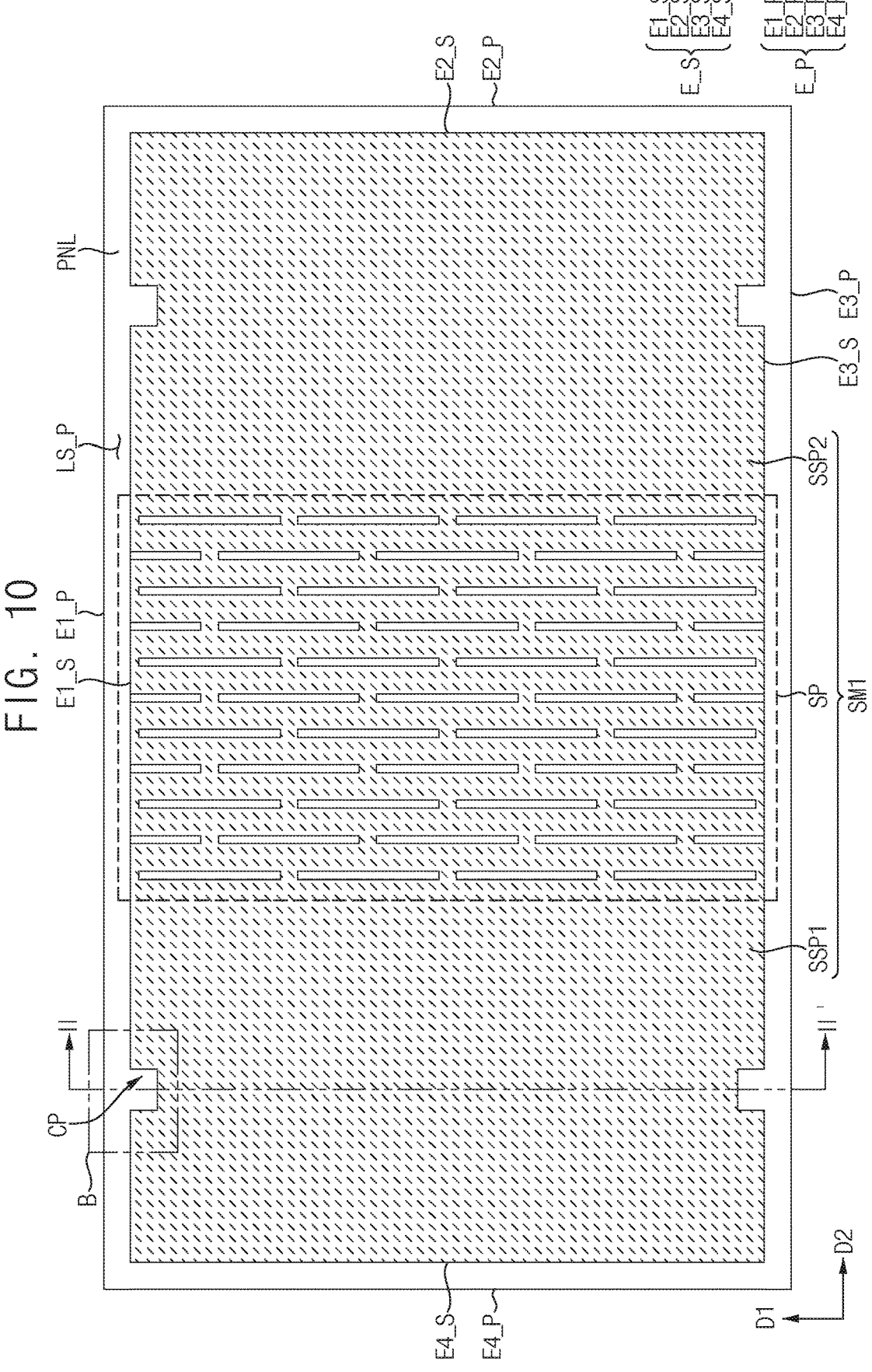
FIG. 10 is a schematic bottom view illustrating a display panel and a support member included in the display device of FIG. 4.
Figure 11:
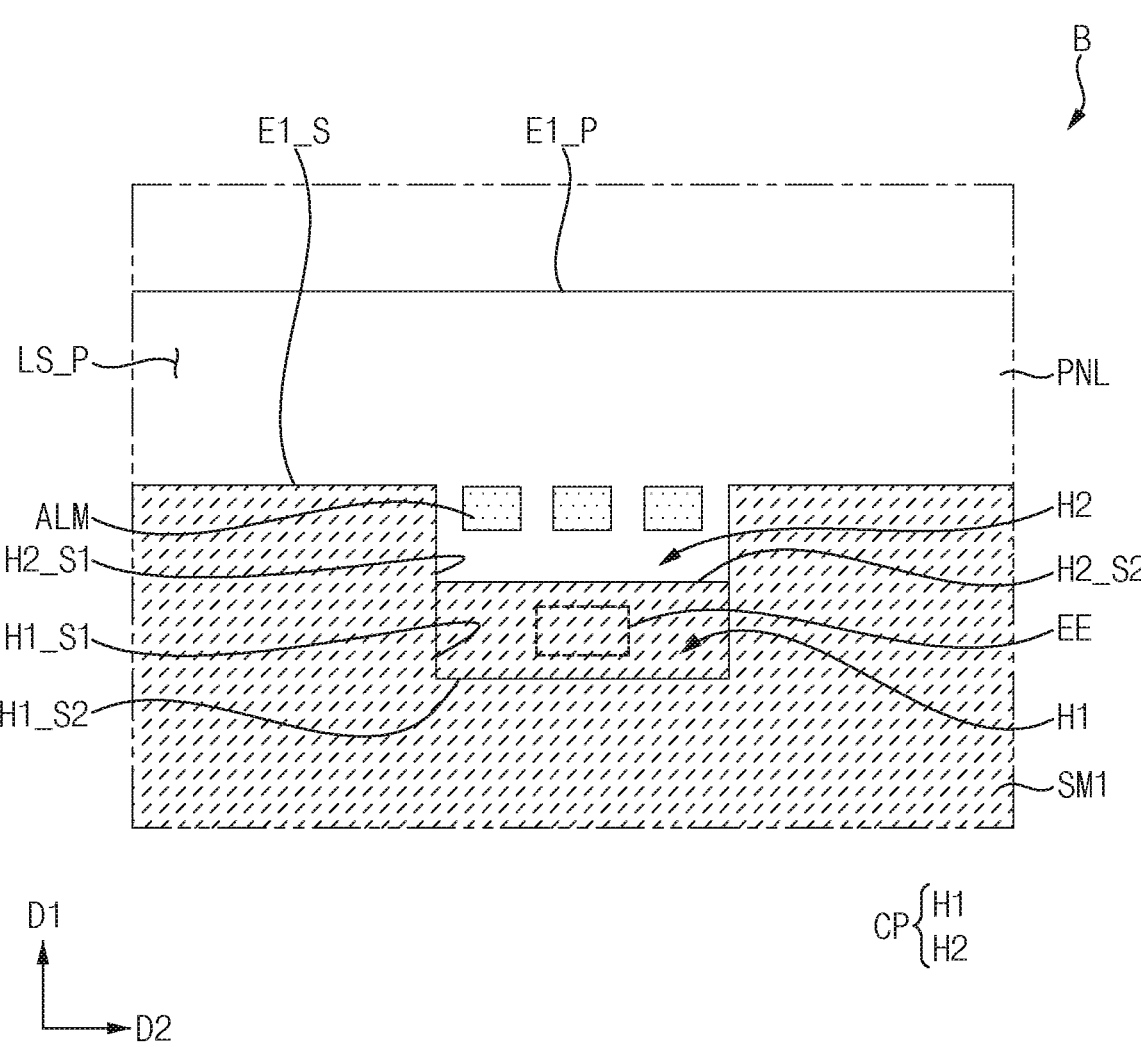
FIG. 11 is a schematic bottom view illustrating an example of area B of FIG. 10.
Figure 12:
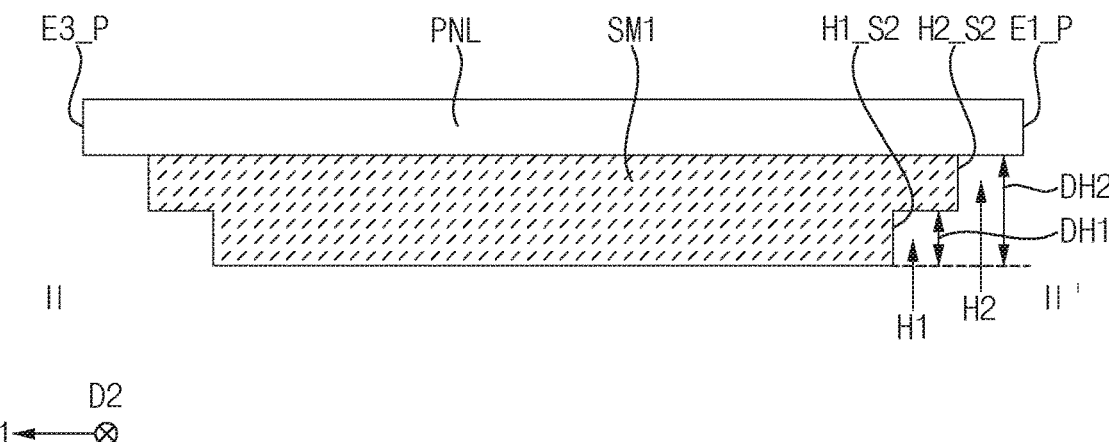
FIG. 12 is a schematic cross-sectional view taken along line II-II' of FIG. 10.

FIG. 10 is a schematic bottom view illustrating a display panel and a support member included in the display device of FIG. 4. FIG. 11 is a schematic bottom view illustrating an example of area B of FIG. 10. FIG. 12 is a schematic cross-sectional view taken along line II-II' of FIG. 10.

Referring to FIG. 10, the first support member SM1 may be disposed on the lower surface LS_P of the display panel PNL. The first support member SM1 may include the first support part SSP1, the second support part SSP2, and the stretchable part SP. The stretchable part SP may be located between the first support part SSP1 and the second support part SSP2.

For example, the edge E_P of the display panel PNL may include a first edge part E1_P, a second edge part E2_P, a third edge part E3_P, and a fourth edge part E4_P.

The first edge part E1_P of the display panel PNL may face the third edge part E3_P of the display panel PNL, and the second edge part E2_P of the display panel PNL may face the fourth edge part E4_P of the display panel PNL. Each of the first edge part E1_P and the third edge part E3_P of the display panel PNL may extend in the second direction D2. Each of the second edge par E2_P and the fourth edge part E4_P of the display panel PNL may extend in the first direction D1.

For example, the edge E_S of the first support member SM1 may include a first edge part E1_S, a second edge part E2_S, a third edge part E3_S, and/or a fourth edge part E4_S.

The first edge part E1_S of the first support member SM1 may face the third edge part E3_S of the first support member SM1, and the second edge part E2_S of the first support member SM1 may face the fourth edge part E4_S of the first support member SM1. Each of the first edge part E1_S and the third edge part E3_S of the first support member SM1 may extend in the second direction D2. Each of the second edge part E2_S and the fourth edge part E4_S of the first support member SM1 may extend in the first direction D1.

For example, the first edge part E1_P of the display panel PNL may be adjacent to the first edge part E1_S of the first support member SM1 and the second edge part E2_P of the display panel PNL may be adjacent to the second edge part E2_S of the first support member SM1. The third edge part E3_P of the display panel PNL may be adjacent to the third edge part E3_S of the first support member SM1, and the fourth edge part E4_P of the display panel PNL may be adjacent to the fourth edge part E4_S of the first support member SM1.

In an embodiment, as described above, the edge E_P of the display panel PNL may protrude outward from the edge E_S of the first support member SM1. For example, the first edge part E1_P of the display panel PNL may protrude outward from the first edge part E1_S of the first support member SM1, and the second edge part E2_P of the display panel PNL may protrude outward from the second edge part E2_S of the first support member SM1. The third edge part E3_P of the display panel PNL may protrude outward from the third edge part E3_S of the first support member SM1, and the fourth edge part E4_P of the display panel PNL may protrude outward from the fourth edge part E4_S of the first support member SM1.

In an embodiment, at least one cutting part CP may be defined in the first support member SM1. The cutting part CP may be defined in the first and second support parts SSP1 and SSP2 of the first support member SM1. The cutting part CP may be formed by removing at least a part of the edge E_S of the first support member SM1. The cutting part CP may be connected (or extended) to the edge E_S of the first support member SM1.

For example, the number of cutting parts CP may be four. The two cutting parts CP may be adjacent to the first edge part E1_S of the first support member SM1, and the remaining two cutting parts CP may be adjacent to the third edge part E3_S of the first support member SM1. The two cutting parts CP may be connected to the first edge part E1_S of the first support member SM1, and the remaining two cutting parts CP may be connected to the third edge part E3_S of the first support member SM1. However, embodiments of the disclosure are not limited thereto, and the number of cutting parts CP may vary.

Further referring to FIGS. 11 and 12, alignment marks ALM may be disposed on the lower surface LS_P of the display panel PNL. The alignment marks ALM may be used as identification marks for alignment in a process of attaching the first support member SM1 to the display panel PNL.

The cutting part CP may include a first groove H1 and a second groove H2. The first groove H1 and the second groove H2 may be connected to each other. In an embodiment, the first groove H1 may have a first depth DH1, and the second groove H2 may have a second depth DH2 greater than the first depth DH1. Each of the first depth DH1 and the second depth DH2 may mean a length in a thickness direction perpendicular to a plane defined by the first and second directions D1 and D2.

In an embodiment, the first groove H1 may expose at least a part of the first support member SM1 and the second groove H2 may expose at least a part of the display panel PNL. For example, the first groove H1 may be formed by half etching a part of the first support member SM1, and the second groove H2 may be formed by full etching the first support member SM1. For example, the first groove H1 may be formed by removing a part of the first support member SM1.

As the first groove H1 does not expose the display panel PNL, the first groove H1 may cover elements EE included in the display panel PNL. For example, the elements EE included in the display panel PNL may not be exposed due to the first groove H1. Accordingly, line defects of the display device DD can be improved.

The first groove H1 may have a polygonal planar shape. For example, the first groove H1 may have a rectangular shape with a side open. However, embodiments of the disclosure are not limited thereto, and the first groove H1 may have various polygonal planar shapes.

For example, the first groove H1 may have two first side surfaces H1_S1 and a second side surface H1_S2. Accordingly, the first side surfaces H1_S1 and the second side surface H1_S2 may define the first groove H1. Each of the first side surfaces H1_S1 may extend in the first direction D1, and the second side surface H1_S2 may extend in the second direction D2. In an embodiment, each of the first side surfaces H1_S1 and the second side surface H1_S2 of the first groove H1 may have a straight line shape in a plan view.

The second groove H2 may have a polygonal planar shape. For example, the second groove H2 may have a rectangular shape with a side open. However, embodiments of the disclosure are not limited thereto, and the second groove H2 may have various planar shapes with a side open.

For example, the second groove H2 may have two first side surfaces H2_S1 and a second side surface H2_S2. Accordingly, the first side surfaces H2_S1 and the second side surface H2_S2 may define the second groove H2. Each of the first side surfaces H2_S1 may extend in the first direction D1, and the second side surface H2_S2 may extend in the second direction D2. The second side surface H2_S2 of the second groove H2 may face the same direction (e.g., the first direction D1) as the second side surface H1_S2 of the first groove H1.

The first groove H1 may entirely overlap the second groove H2 in the first direction D1. For example, the first side surface H1_S1 of the first groove H1 may be connected to the first side surface H2_S1 of the second groove H2.

The second groove H2 may be connected to the edge E_S of the first support member SM1. For example, the second groove H2 may be connected to the first edge part E1_S and the third edge part E3_S of the first support member SM1. Accordingly, the first and second side surfaces H2_S1 and H2_S2 of the second groove H2 may be connected to the edge E_S of the first support member SM1.

The cutting part CP may overlap the alignment marks ALM in a plan view. The second groove H2 of the cutting part CP may overlap the alignment marks ALM in the plan view. The first groove H1 may be spaced apart from the alignment marks ALM in the plan view. For example, the first groove H1 may not overlap the alignment marks ALM in the plan view.

In case that the lengths of the first side surfaces H1_S1 and H2_S1 of the first and second grooves H1 and H2 extending in the first direction D1 are not sufficient, in the process of attaching the first support member SM1 to the display panel PNL, the cutting part CP may not be clearly recognized. The first support member SM1 may not be accurately attached to the display panel PNL.

Referring again to FIGS. 1 to 12, the display device DD according to embodiments of the disclosure may include the display panel PNL including the foldable area FA and the non-folding areas NFA1 and NFA2 adjacent to at least one side of the foldable area FA and the first support member SM1 disposed under the display panel PNL. The edge E_P of the display panel PNL may protrude outward from the edge E_S of the first support member SM1. Accordingly, a display device DD that does not include a deco covering the edge E_P of the display panel PNL may be implemented. Since the display device DD does not include the deco, aesthetics of the display device DD can be improved.

At least one cutting part CP including the first groove H1 having the first depth DH1 and the second groove H2 having the second depth DH2 greater than the first depth DH1 may be defined in the first support member SM1. Accordingly, line defects of the display device DD can be improved. In the process of attaching the first support member SM1 to the display panel PNL, the first support member SM1 can be accurately attached to the display panel PNL.

Figure 13:
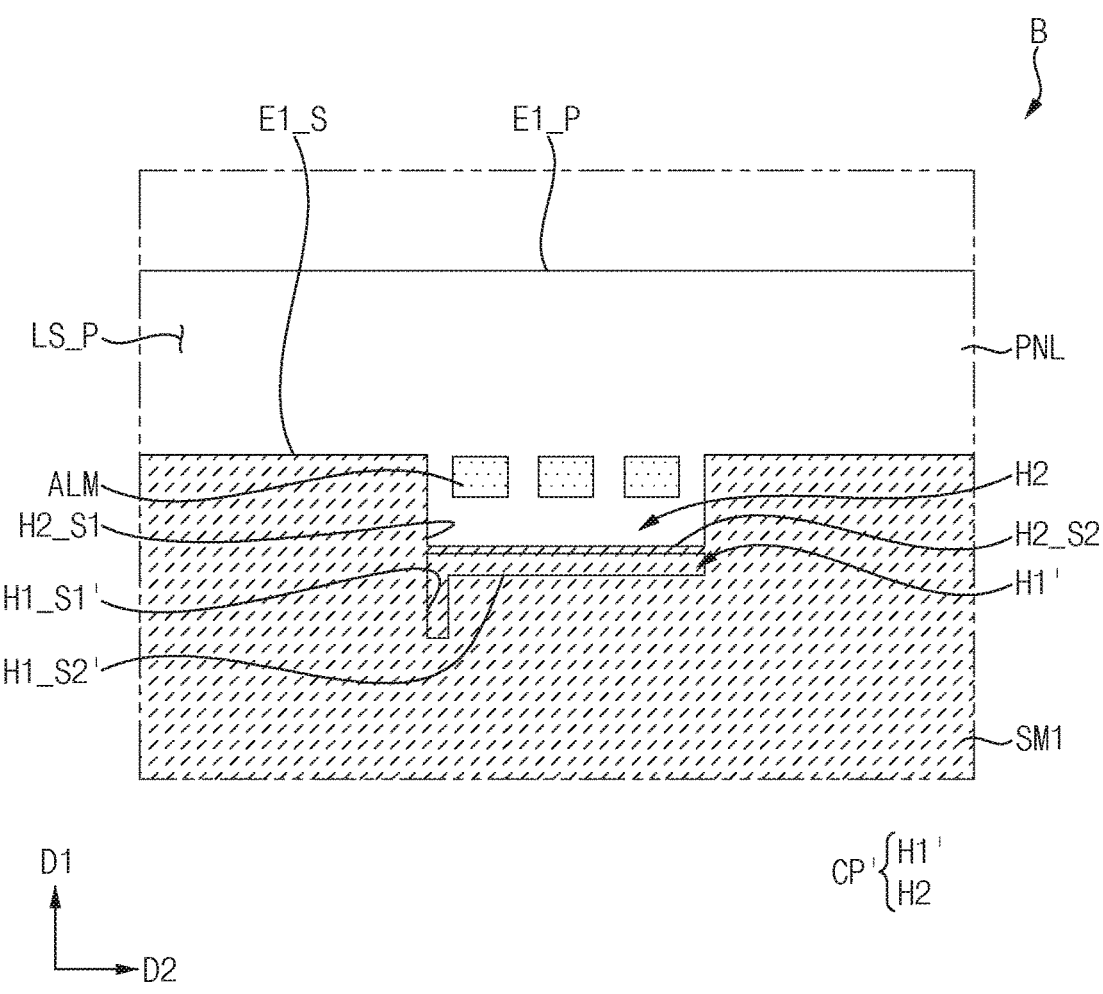
FIGS. 13, 14, and 15 are schematic bottom views illustrating other examples of area B of FIG. 10.
Figure 14:
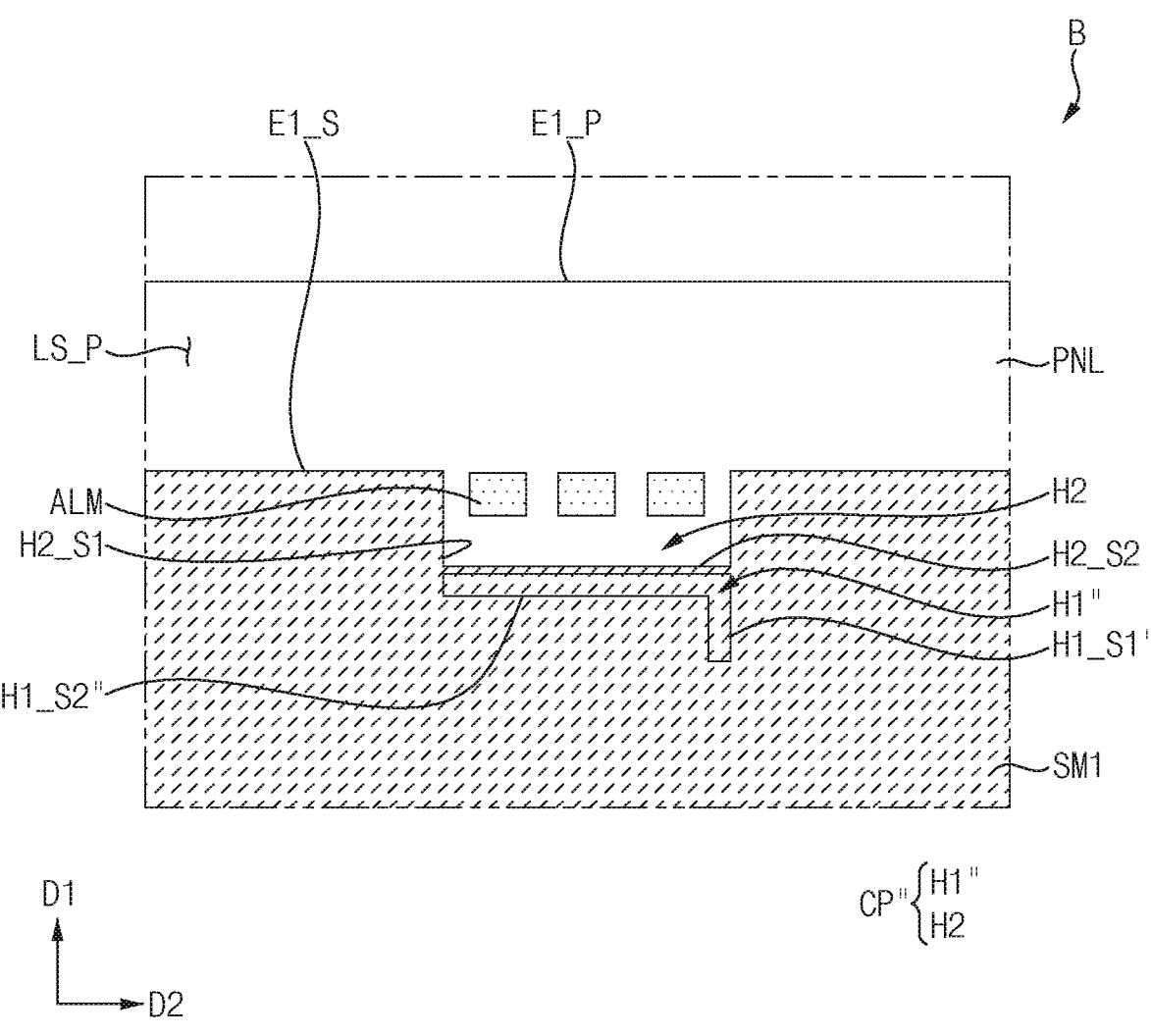
Figure 15:
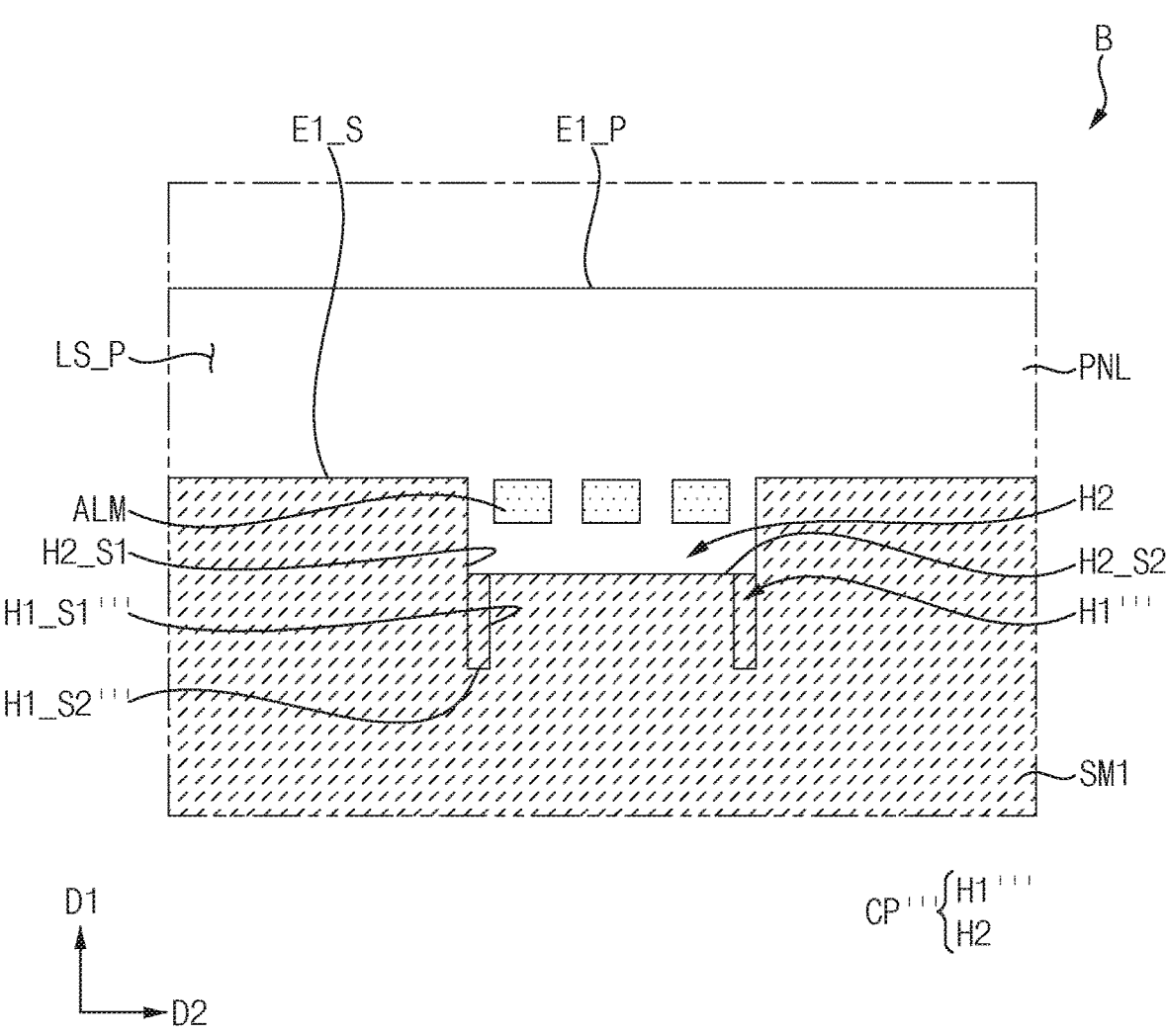

FIGS. 13, 14, and 15 are schematic bottom views illustrating other examples of area B of FIG. 10. Cutting parts CP', CP", and CP''' of the first support member SM1 described with reference to FIGS. 13, 14, and 15 may be distinguishable from the first support member SM1 described with reference to FIGS. 10, 11, and 12 at least in the shape of first grooves H1', H1", and H1'''. Hereinafter, the same reference numerals are given to the same components as those described with reference to FIGS. 10, 11, and 12, and descriptions thereof are omitted or simplified.

Referring to FIG. 13, the cutting part CP' may include the first groove H1' and the second groove H2. In an embodiment, the first groove H1' may expose at least a part of the first support member SM1, and the second groove H2 may expose at least a part of the display panel PNL.

The first groove H1' may have a polygonal planar shape. In an embodiment, the first groove H1' may have an "L"-shaped planar shape. For example, the first groove H1' may have an "L"-shaped planar shape rotated about 90 degrees in a clockwise direction.

For example, the first groove H1' may have three first side surfaces H1_S1' and three second side surfaces H1_S2'. Each of the first side surfaces H1_S1' may extend in the first direction D1, and each of the second side surfaces H1_S2' may extend in the second direction D2. In an embodiment, each of the first side surface H1_S1' and the second side surface H1_S2' of the first groove H1' may have a straight line shape in a plan view.

The first groove H1' may not be connected to the second groove H2. The first groove H1' may entirely overlap the second groove H2 in the first direction D1. However, embodiments of the disclosure are not limited thereto, and the first groove H1' may be connected to the second groove H2.

Referring to FIG. 14, the cutting part CP" may include the first groove H1" and the second groove H2. In an embodiment, the first groove H1" may expose at least a part of the first support member SM1, and the second groove H2 may expose at least a part of the display panel PNL.

The first groove H1" may have a polygonal planar shape. In an embodiment, the first groove H1" may have an "L"-shaped planar shape. For example, the first groove H1" may have an "L"-shaped planar shape rotated about 90 degrees clockwise and inverted with respect to an imaginary axis passing through the center of the first groove H1" and extending in the first direction D1.

For example, the first groove H1" may have three first side surfaces H1_S1" and three second side surfaces H1_S2". Each of the first side surfaces H1_S1" may extend in the first direction D1, and each of the second side surfaces H1_S2" may extend in the second direction D2. In an embodiment, each of the first side surface H1_S1" and the second side surface H1_S2" of the first groove H1" may have a straight line shape in a plan view.

The first groove H1" may not be connected to the second groove H2. The first groove H1" may entirely overlap the second groove H2 in the first direction D1. However, embodiments of the disclosure are not limited thereto, and the first groove H1" may be connected to the second groove H2.

Referring to FIG. 15, the cutting part CP''' may include the first groove H1''' and the second groove H2. In an embodiment, the first groove H1''' may expose at least a part of the first support member SM1, and the second groove H2 may expose at least a part of the display panel PNL.

The number of first grooves H1''' may be plural. For example, there may be two first grooves H1'''. The two first grooves H1''' may be spaced apart from each other. The two first grooves H1''' may be spaced apart from each other in the second direction D2. However, embodiments of the disclosure are not limited thereto.

Each of the first grooves H1''' may have a polygonal planar shape. In an embodiment, each of the first grooves H1''' may have a rectangular planar shape with a side open.

For example, each of the first grooves H1''' may have two first side surfaces H1_S1''' and a second side surface H1_S2'''. Each of the first side surfaces H1_S1''' may extend in the first direction D1, and the second side surface H1_S2''' may extend in the second direction D2. In an embodiment, each of the first side surfaces H1_S1''' and the second side surface H1_S2''' of the first groove H1''' may have a straight line shape in a plan view.

The first groove H1''' may be connected to the second groove H2. One of the first side surfaces H1_S1''' of each of the first grooves H1''' may be connected to the first side surface H2_S1 of the second groove H2. However, embodiments of the disclosure are not limited thereto, and the first groove H1''' may not be connected to the second groove H2.

However, embodiments of the disclosure are not limited thereto, and a first groove may have various polygonal planar shapes such that each of a first side surface extending in the first direction D1 and a second side surface extending in the second direction D2 of the first groove has a straight line shape in a plan view.

The disclosure can be applied to various display devices. For example, the disclosure is applicable to various display devices such as display devices for vehicles, ships and aircraft, portable communication devices, display devices for exhibition or information transmission, medical display devices, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the disclosure. Accordingly, all such modifications are intended to be included within the scope of the disclosure. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:
a display panel including a display area including:
a foldable area having flexibility; and
a non-folding area adjacent to at least one side of the foldable area; and
a support member disposed under the display panel, including a stretchable part overlapping the foldable area, the support member defining at least one cutting part overlapping the non-folding area,
wherein the at least one cutting part includes:
at least one first groove having a first depth, an uppermost surface closest to the display panel of each of the at least one first groove exposes a portion of the support member; and a second groove having a second depth greater than the first depth, an uppermost surface closest to the display panel of the second groove exposes a portion of the display panel.

2. The display device of claim 1, wherein the at least one cutting part is adjacent to an edge of the support member.

3. The display device of claim 1, wherein the at least one first groove includes:

a first side surface extending in a first direction; and a second side surface extending in a second direction perpendicular to the first direction, and each of the first and second side surfaces has straight line shape in a plan view.

4. The display device of claim 1, wherein the at least one first groove has a rectangular planar shape with one side open.

5. The display device of claim 1, wherein the at least one first groove has an "L" shape planar shape.

6. The display device of claim 1, wherein the at least one first groove includes a plurality of first grooves, and each of the plurality of first grooves has a rectangular planar shape with one side open.

7. The display device of claim 6, wherein the plurality of first grooves are spaced apart from each other.

8. The display device of claim 1, wherein the at least one first groove is connected to the second groove.

9. The display device of claim 1, wherein the at least one first groove is spaced apart from the second groove in a plan view.

10. The display device of claim 1, wherein the second groove overlaps alignment marks disposed on a lower surface of the display panel in a plan view, and the at least one first groove is spaced apart from the alignment marks in the plan view.

11. The display device of claim 1, wherein sides surfaces defining the second groove are connected to an edge of the support member.

12. The display device of claim 1, wherein when viewed from the display panel toward the support member, the support member is completely covered by the display panel in a plan view.

13. The display device of claim 1, wherein an edge of the display panel protrudes outward from an edge of the support member.

14. The display device of claim 1, wherein a plurality of openings are defined in the stretchable part, and each of the plurality of openings has a planar shape of any one of a rectangle, a rhombus, an ellipse, and a wavy shape.

15. The display device of claim 1, wherein the support member includes at least one selected form a group consisting of stainless steel and a magnesium alloy.

16. The display device of claim 1, wherein the support member includes at least one selected from a group consisting of carbon fiber reinforced plastic and glass fiber reinforced plastic.

17. A display device comprising:

a display panel including a display area including a foldable area having flexibility and a non-folding area adjacent to at least one side of the foldable area;

a first support member disposed under the display panel, including a stretchable part in which a plurality of openings defined and overlapping the foldable area, and the first support member defining at least one cutting part overlapping the non-folding area and including at least one first groove having a first depth and a second groove having a second depth greater than the first depth; and a second support member disposed under the first support member and including a first support plate and a second support plate spaced apart from each other, wherein an uppermost surface closest to the display panel of each of the at least one first groove exposes a portion of the first support member and an uppermost surface closest to the display panel of the second groove exposes a portion of the display panel.

18. The display device of claim 17, wherein the at least one cutting part is adjacent to an edge of the first support member.

19. The display device of claim 17, wherein the at least one first groove includes a first side surface extending in a first direction and a second side surface extending in a second direction perpendicular to the first direction, and each of the first and second side surfaces has straight line shape in a plan view.

20. The display device of claim 17, wherein the at least one first groove has a rectangular planar shape with one side open.

21. The display device of claim 17, wherein the at least one first groove has an "L" shape planar shape.

22. The display device of claim 17, wherein the at least one first groove includes a plurality of first grooves, the plurality of first grooves are spaced apart from each other, and each of the plurality of first grooves has a rectangular planar shape with one side open.

23. The display device of claim 17, wherein the second groove overlaps alignment marks disposed on a lower surface of the display panel in a plan view, and the at least one first groove is spaced apart from the alignment marks in the plan view.

24. The display device of claim 17, wherein when viewed from the display panel toward the first support member, the first support member is completely covered by the display panel in a plan view.

25. The display device of claim 17, wherein an edge of the display panel protrudes outward from an edge of the first support member.

26. The display device of claim 17, wherein each of the first support member and the second support member includes at least one selected form a group consisting of stainless steel, a magnesium alloy, carbon fiber reinforced plastic, and glass fiber reinforced plastic.

* * * * *